(12) United States Patent
Luo

(10) Patent No.: US 7,585,805 B2
(45) Date of Patent: Sep. 8, 2009

(54) NICKEL-BASED CATALYST COMPOSITION

(75) Inventor: Steven Luo, Copley, OH (US)

(73) Assignee: Bridgestone Corporation

( * ) Notice: Subject to any disclaimer, the term of this patent is extended or adjusted under 35 U.S.C. 154(b) by 577 days.

(21) Appl. No.: 11/285,434

(22) Filed: Nov. 22, 2005

(65) Prior Publication Data

US 2007/0117942 A1    May 24, 2007

(51) Int. Cl.
*C08F 4/70* (2006.01)
*B01J 31/16* (2006.01)
*C08F 36/04* (2006.01)

(52) U.S. Cl. .................. 502/119; 502/103; 502/128; 502/131; 526/133; 526/134; 526/169.1; 526/340.4

(58) Field of Classification Search ............ 502/103, 502/119, 128, 131; 526/133, 169.1, 340.4, 526/134
See application file for complete search history.

(56) References Cited

U.S. PATENT DOCUMENTS

| | | |
|---|---|---|
| 3,170,905 A | 2/1965 | Ueda et al. |
| 3,170,907 A | 2/1965 | Ueda et al. |
| 3,483,177 A | 12/1969 | Throckmorton et al. |
| 3,528,957 A | 9/1970 | Throckmorton et al. |
| 3,814,744 A | 6/1974 | Yagi et al. |
| 3,816,567 A | 6/1974 | Yagi et al. |
| 3,856,764 A | 12/1974 | Throckmorton et al. |
| 3,910,869 A | 10/1975 | Throckmorton et al. |
| 4,522,988 A | 6/1985 | Kang et al. |
| 5,686,543 A | 11/1997 | Yasuda et al. |
| 5,955,533 A | 9/1999 | Miskovic et al. |
| 6,699,813 B2 | 3/2004 | Luo et al. |

FOREIGN PATENT DOCUMENTS

GB    1 373 701    11/1974

*Primary Examiner*—Caixia Lu
(74) *Attorney, Agent, or Firm*—Meredith E. Hooker; Arthur Reginelli

(57) ABSTRACT

A catalyst composition that is the combination of or the reaction product of ingredients comprising (a) a nickel-containing compound, (b) an alkylating agent, (c) a fluorine-containing compound, and (d) a chlorine-containing compound.

16 Claims, No Drawings

NICKEL-BASED CATALYST COMPOSITION

FIELD OF THE INVENTION

One or more embodiments of the present invention are directed toward nickel-based catalyst compositions and methods for producing nickel-catalyzed polydienes with a narrow molecular weight distribution.

BACKGROUND OF THE INVENTION

Nickel-based catalyst systems including a nickel-containing compound, an organoaluminum compound, and a fluorine-containing compound may be employed for polymerizing 1,3-butadiene to form cis-1,4-polybutadiene. The cis-1,4-polybutadiene produced by nickel-based catalyst systems can have a broad molecular weight distribution. Because a polymer having a narrower molecular weight distribution may offer certain advantages such as higher abrasion resistance, lower hysteresis, and better tensile properties, it may be desirable to develop a nickel-based catalyst system that is capable of producing cis-1,4-polybutadiene having a narrower molecular weight distribution.

SUMMARY OF THE INVENTION

In one or more embodiments, the present invention provides a catalyst composition that is the combination of or the reaction product of ingredients comprising (a) a nickel-containing compound, (b) an alkylating agent, (c) a fluorine-containing compound, and (d) a chlorine-containing compound.

In one or more embodiments, the present invention also provides a catalyst composition that is the combination of or the reaction product of ingredients comprising (a) a nickel-containing compound, (b) an alkylating agent, (c) a fluorine-containing compound, and (d) optionally a chlorine-containing compound, with the proviso that the ingredients include a chlorine atom, and the molar ratio of said chlorine atom to said nickel-containing compound (Cl/Ni) is from about 0.01:1 to about 0.5:1.

In one or more embodiments, the present invention further provides a process for forming conjugated diene polymer comprising the step of polymerizing conjugated diene monomer in the presence of a catalytically effective amount of a catalyst composition formed by combining (a) a nickel-containing compound, (b) an alkylating agent, (c) a fluorine-containing compound, and (d) a chlorine-containing compound.

DETAILED DESCRIPTION OF ILLUSTRATIVE EMBODIMENTS

The catalyst composition of one or more embodiments of the present invention includes the combination of or reaction product of ingredients including (a) a nickel-containing compound, (b) an alkylating agent, (c) optionally a fluorine-containing compound, and (d) optionally a chlorine-containing compound. To the extent that the nickel-containing compound or alkylating agent may also include fluorine and/or chlorine, the fluorine-containing compound and the chlorine-containing compound can be optional as separate and distinct compounds so long as the catalyst composition or the ingredients thereof include a chlorine-containing compound and a fluorine-containing compound.

Various nickel-containing compounds or mixtures thereof can be employed. In one or more embodiments, these nickel-containing compounds may be soluble in hydrocarbon solvents such as aromatic hydrocarbons, aliphatic hydrocarbons, or cycloaliphatic hydrocarbons. In other embodiments, hydrocarbon-insoluble nickel-containing compounds, which can be suspended in the polymerization medium to form catalytically active species, may also be useful.

The nickel atom in the nickel-containing compounds can be in various oxidation states including but not limited to the 0, +2, +3, and +4 oxidation states. Nickel-containing compounds include, but are not limited to, nickel carboxylates, nickel carboxylate borates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds.

Nickel carboxylates can include nickel formate, nickel acetate, nickel acetate, nickel acrylate, nickel methacrylate, nickel valerate, nickel gluconate, nickel citrate, nickel fumarate, nickel lactate, nickel maleate, nickel oxalate, nickel 2-ethylhexanoate, nickel neodecanoate, nickel naphthenate, nickel stearate, nickel oleate, nickel benzoate, and nickel picolinate.

Nickel carboxylate borates may include compounds defined by the formulae $(RCOONiO)_3B$ or $(RCOONiO)_2B(OR)$, where each R, which may be the same or different, is a hydrogen atom or a mono-valent organic group. In one embodiment, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Nickel carboxylate borate may include those disclosed in U.S. Pat. No. 4,522,988, which is incorporated herein by reference. Specific examples of nickel carboxylate borate include nickel(II) neodecanoate borate, nickel(II) hexanoate borate, nickel(II) naphthenate borate, nickel(II) stearate borate, nickel(II) octoate borate, nickel(II) 2-ethylhexanoate borate, and mixtures thereof.

Nickel organophosphates can include nickel dibutyl phosphate, nickel dipentyl phosphate, nickel dihexyl phosphate, nickel diheptyl phosphate, nickel dioctyl phosphate, nickel bis(1-methylheptyl) phosphate, nickel bis(2-ethylhexyl) phosphate, nickel didecyl phosphate, nickel didodecyl phosphate, nickel dioctadecyl phosphate, nickel dioleyl phosphate, nickel diphenyl phosphate, nickel bis(p-nonylphenyl) phosphate, nickel butyl (2-ethylhexyl)phosphate, nickel (1-methylheptyl) (2-ethylhexyl) phosphate, and nickel (2-ethylhexyl) (p-nonylphenyl) phosphate.

Nickel organophosphonates can include nickel butyl phosphonate, nickel pentyl phosphonate, nickel hexyl phosphonate, nickel heptyl phosphonate, nickel octyl phosphonate, nickel (1-methylheptyl)phosphonate, nickel (2-ethylhexyl) phosphonate, nickel decyl phosphonate, nickel dodecyl phosphonate, nickel octadecyl phosphonate, nickel oleyl phosphonate, nickel phenyl phosphonate, nickel (p-nonylphenyl) phosphonate, nickel butyl butylphosphonate, nickel pentyl pentylphosphonate, nickel hexyl hexylphosphonate, nickel heptyl heptylphosphonate, nickel octyl octylphosphonate, nickel (1-methylheptyl) (1-methylheptyl)phosphonate, nickel (2-ethylhexyl) (2-ethylhexyl)phosphonate, nickel decyl decylphosphonate, nickel dodecyl dodecylphosphonate, nickel octadecyl octadecylphosphonate, nickel oleyl oleylphosphonate, nickel phenyl phenylphosphonate, nickel (p-nonylphenyl) (p-nonylphenyl)phosphonate, nickel butyl (2-ethylhexyl)phosphonate, nickel (2-ethylhexyl) butylphosphonate, nickel (1-methylheptyl) (2-ethylhexyl)phosphonate, nickel (2-ethylhexyl) (1-methylheptyl)phosphonate, nickel (2-ethylhexyl) (p-nonylphenyl)phosphonate, and nickel (p-nonylphenyl) (2-ethylhexyl)phosphonate.

Nickel organophosphinates can include nickel butylphosphinate, nickel pentylphosphinate, nickel hexylphosphinate, nickel heptylphosphinate, nickel octylphosphinate, nickel (1-methylheptyl)phosphinate, nickel (2-ethylhexyl)phosphinate, nickel decylphosphinate, nickel dodecylphosphinate, nickel octadecylphosphinate, nickel oleylphosphinate, nickel phenylphosphinate, nickel (p-nonylphenyl)phosphinate, nickel dibutylphosphinate, nickel dipentylphosphinate, nickel dihexylphosphinate, nickel diheptylphosphinate, nickel dioctylphosphinate, nickel bis(1-methylheptyl)phosphinate, nickel bis(2-ethylhexyl)phosphinate, nickel didecylphosphinate, nickel didodecylphosphinate, nickel dioctadecylphosphinate, nickel dioleylphosphinate, nickel diphenylphosphinate, nickel bis(p-nonylphenyl)phosphinate, nickel butyl(2-ethylhexyl)phosphinate, nickel (1-methylheptyl)(2-ethylhexyl)phosphinate, and nickel (2-ethylhexyl)(p-nonylphenyl)phosphinate.

Nickel carbamates can include nickel dimethylcarbamate, nickel diethylcarbamate, nickel diisopropylcarbamate, nickel dibutylcarbamate, and nickel dibenzylcarbamate.

Nickel dithiocarbamates can include nickel dimethyldithiocarbamate, nickel diethyldithiocarbamate, nickel diisopropyldithiocarbamate, nickel dibutyldithiocarbamate, and nickel dibenzyldithiocarbamate.

Nickel xanthates include nickel methylxanthate, nickel ethylxanthate, nickel isopropylxanthate, nickel butylxanthate, and nickel benzylxanthate.

Nickel β-diketonates can include nickel acetylacetonate, nickel trifluoroacetylacetonate, nickel hexafluoroacetylacetonate, nickel benzoylacetonate, and nickel 2,2,6,6-tetramethyl-3,5-heptanedionate.

Nickel alkoxides or aryloxides can include nickel methoxide, nickel ethoxide, nickel isopropoxide, nickel 2-ethylhexoxide, nickel phenoxide, nickel nonylphenoxide, and nickel naphthoxide.

Nickel halides can include nickel fluoride, nickel chloride, nickel bromide, and nickel iodide. Nickel pseudo-halides include nickel cyanide, nickel cyanate, nickel thiocyanate, nickel azide, and nickel ferrocyanide. Nickel oxyhalides include nickel oxyfluoride, nickel oxychloride and nickel oxybromide. Where the nickel halides, nickel oxyhalides or other nickel-containing compounds contain labile fluorine or chlorine atoms, the nickel-containing compounds can also serve as the fluorine-containing compound or the chlorine-containing compound. A Lewis base such as an alcohol can be used as a solubility aid for this class of compounds.

The term organonickel compound may refer to any nickel compound containing at least one nickel-carbon bond. Organonickel compounds include bis(cyclopentadienyl)nickel (also called nickelocene), bis(pentamethylcyclopentadienyl) nickel (also called decamethylnickelocene), bis(tetramethylcyclopentadienyl)nickel, bis(ethylcyclopentadienyl)nickel, bis(isopropylcyclopentadienyl)nickel, bis(pentadienyl) nickel, bis(2,4-dimethylpentadienyl)nickel, (cyclopentadienyl)(pentadienyl)nickel, bis(1,5-cyclooctadiene)nickel, bis (allyl)nickel, bis(methallyl)nickel, and bis(crotyl)nickel.

Various alkylating agents, or mixtures thereof, can be used. Alkylating agents, which may also be referred to as hydrocarbylating agents, include organometallic compounds that can transfer hydrocarbyl groups to another metal. Typically, these agents include organometallic compounds of electropositive metals such as Groups 1, 2, and 3 metals (Groups IA, IIA, and IIIA metals). In one or more embodiments, alkylating agents include organoaluminum and organomagnesium compounds. Where the alkylating agent includes labile fluorine or chlorine atoms, the alkylating agent may also serve as the fluorine-containing compound or the chlorine-containing compound.

The term "organoaluminum compound" may refer to any aluminum compound containing at least one aluminum-carbon bond. In one or more embodiments, organoaluminum compounds may be soluble in a hydrocarbon solvent.

In one or more embodiments, organoaluminum compounds include those represented by the formula $AlR_nX_{3-n}$, where each R, which may be the same or different, is a mono-valent organic group that is attached to the aluminum atom via a carbon atom, where each X, which may be the same or different, is a hydrogen atom, a halogen atom, a carboxylate group, an alkoxide group, or an aryloxide group, and where n is an integer of 1 to 3. In one or more embodiments, each R may be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, where each group may contain from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms.

Organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds.

Trihydrocarbylaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Dihydrocarbylaluminum hydride compounds include diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Hydrocarbylaluminum dihydrides include ethylaluminum dihydride, n-propylaluminum dihydride, isopropylaluminum dihydride, n-butylaluminum dihydride, isobutylaluminum dihydride, and n-octylaluminum dihydride.

Dihydrocarbylaluminum chloride compounds include diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Hydrocarbylaluminum dichloride include ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds include dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds include aluminoxanes. Aluminoxanes include oligomeric linear aluminoxanes that can be represented by the general formula:

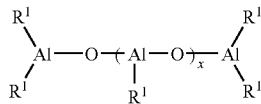

and oligomeric cyclic aluminoxanes that can be represented by the general formula:

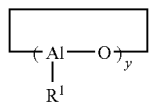

where x may be an integer of 1 to about 100, and in other embodiments about 10 to about 50; y may be an integer of 2 to about 100, and in other embodiments about 3 to about 20; and where each $R^1$, which may be the same or different, may be a mono-valent organic group that is attached to the aluminum atom via a carbon atom. In one or more embodiments, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, where each group may contain from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound may be dissolved in an organic solvent and then contacted with water, (2) a method in which the trihydrocarbylaluminum compound may be reacted with water of crystallization contained in, for example, metal salts, or water adsorbed in inorganic or organic compounds, and (3) a method in which the trihydrocarbylaluminum compound may be reacted with water in the presence of the monomer or monomer solution that is to be polymerized.

Aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20-80% of the methyl groups of methylaluminoxane with $C_2$ to $C_{12}$ hydrocarbyl groups, preferably with isobutyl groups, by using techniques known to those skilled in the art.

Aluminoxanes can be used alone or in combination with other organoaluminum compounds. In one embodiment, methyl aluminoxane and diisobutyl aluminum hydride are employed in combination.

The term organomagnesium compound may refer to any magnesium compound that contains at least one magnesium-carbon bond. Organomagnesium compounds may be soluble in a hydrocarbon solvent. One class of organomagnesium compounds that can be utilized may be represented by the formula $MgR^2_2$, where each $R^2$, which may be the same or different, is a mono-valent organic group, with the proviso that the group is attached to the magnesium atom via a carbon atom. In one or more embodiments, each $R^2$ may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkylyl groups, where each group may contain from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atom.

Examples of suitable dihydrocarbylmagnesium compounds that can be utilized include diethylmagnesium, di-n-propylmagnesium, diisopropylmagnesium, dibutylmagnesium, dihexylmagnesium, diphenylmagnesium, dibenzylmagnesium, and mixtures thereof. Dibutylmagnesium may be readily available and may be soluble in aliphatic and cycloaliphatic hydrocarbon solvents.

Another class of organomagnesium compounds that can be utilized include those that may be represented by the formula R3MgX, where R3 is a mono-valent organic group, with the proviso that the group is attached to the magnesium atom via a carbon atom, and X is a hydrogen atom, a halogen atom, a carboxylate group, an alkoxide group, or an aryloxide group. Where the alkylating agent is an organomagnesium compound that includes a labile halogen atom, the organomagnesium compound can serve as both the alkylating agent and the halogen-containing compound. In one or more embodiments, R3 may be a hydrocarbyl group such as, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, where each group may contain from 1 carbon atom, or the appropriate minimum number of carbon atoms to form the group, up to about 20 carbon atoms. These hydrocarbyl groups may contain heteroatoms such as, but not limited to, nitrogen, oxygen, boron, silicon, sulfur, and phosphorus atoms. In one or more embodiments, X is a carboxylate group, an alkoxide group, or an aryloxide group, where each group may contain 1 to 20 carbon atoms.

Organomagnesium compounds that can be represented by the formula R3MgX include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and mixtures thereof.

Organomagnesium compounds that may be represented by the formula R3MgX include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Fluorine-containing compounds may include various compounds, or mixtures thereof, that contain one or more labile fluorine atoms. In one or more embodiments, the fluorine-containing compound may be soluble in a hydrocarbon solvent. In other embodiments, hydrocarbon-insoluble fluorine-containing compounds, which can be suspended in the polymerization medium to form the catalytically active species, may be useful.

Types of fluorine-containing compounds include, but are not limited to, elemental fluorine, halogen fluorides, hydrogen fluoride, organic fluorides, inorganic fluorides, metallic fluorides, organometallic fluorides, and mixtures thereof. In one or more embodiments, the complexes of the fluorine-containing compounds with a Lewis base such as ethers, alcohols, water, aldehydes, ketones, esters, nitriles, or mixtures thereof may be employed. Specific examples of these complexes include the complexes of boron trifluoride and hydrogen fluoride with a Lewis base.

Halogen fluorides may include iodine monofluoride, iodine trifluoride, and iodine pentafluoride.

Organic fluorides may include t-butyl fluoride, allyl fluoride, benzyl fluoride, fluoro-di-phenylmethane, triphenylmethyl fluoride, benzylidene fluoride, methyltrifluorosilane, phenyltrifluorosilane, dimethyldifluorosilane, diphenyldifluorosilane, trimethylfluorosilane, benzoyl fluoride, propionyl fluoride, and methyl fluoroformate.

Inorganic fluorides may include phosphorus trifluoride, phosphorus pentafluoride, phosphorus oxyfluoride, boron trifluoride, silicon tetrafluoride, arsenic trifluoride, selenium tetrafluoride, and tellurium tetrafluoride.

Metallic fluorides may include tin tetrafluoride, aluminum trifluoride, antimony trifluoride, antimony pentafluoride, gallium trifluoride, indium trifluoride, titanium tetrafluoride, and zinc difluoride.

Organometallic fluorides may include dimethylaluminum fluoride, diethylaluminum fluoride, methylaluminum difluoride, ethylaluminum difluoride, methylaluminum sesquifluoride, ethylaluminum sesquifluoride, isobutylaluminum sesquifluoride, methylmagnesium fluoride, ethylmagnesium fluoride, butylmagnesium fluoride, phenylmagnesium fluoride, benzylmagnesium fluoride, trimethyltin fluoride, triethyltin fluoride, di-t-butyltin difluoride, dibutyltin difluoride, and tributyltin fluoride.

Various compounds, or mixtures thereof, that contain one or more labile chlorine atoms can be employed as the chlorine-containing compound. In one or more embodiments, the chlorine-containing compound may be soluble in a hydrocarbon solvent. In other embodiments, hydrocarbon-insoluble chlorine-containing compounds, which can be suspended in the polymerization medium to form the catalytically active species, may be useful.

Types of chlorine-containing compounds include, but are not limited to, elemental chlorine, halogen chlorides, hydrogen chloride, organic chlorides, inorganic chlorides, metallic chlorides, organometallic chlorides, and mixtures thereof.

Halogen chlorides may include iodine monochloride, iodine trichloride, and iodine pentachloride.

Organic chlorides may include t-butyl chloride, allyl chloride, benzyl chloride, chloro-di-phenylmethane, triphenylmethyl chloride, benzylidene chloride, methyltrichlorosilane, phenyltrichlorosilane, dimethyldichlorosilane, diphenyldichlorosilane, trimethylchlorosilane, benzoyl chloride, propionyl chloride, and methyl chloroformate.

Inorganic chlorides may include phosphorus trichloride, phosphorus pentachloride, phosphorus oxychloride, boron trichloride, silicon tetrachloride, arsenic trichloride, selenium tetrachloride, and tellurium tetrachloride.

Metallic chlorides may include tin tetrachloride, aluminum trichloride, antimony trichloride, antimony pentachloride, gallium trichloride, indium trichloride, titanium tetrachloride, and zinc dichloride. Organometallic chlorides may include dimethylaluminum chloride, diethylaluminum chloride, methylaluminum dichloride, ethylaluminum dichloride, methylaluminum sesquichloride, ethylaluminum sesquichloride, isobutylaluminum sesquichloride, methylmagnesium chloride, ethylmagnesium chloride, butylmagnesium chloride, phenylmagnesium chloride, benzylmagnesium chloride, trimethyltin chloride, triethyltin chloride, di-t-butyltin dichloride, dibutyltin dichloride, and tributyltin chloride.

The foregoing catalyst compositions may have high catalytic activity for polymerizing conjugated dienes into stereospecific polydienes over a wide range of catalyst concentrations and catalyst ingredient ratios. It is believed that the catalyst ingredients may interact to form an active catalyst species. It is also believed that the optimum concentration for any one catalyst ingredient may be dependent upon the concentration of the other catalyst ingredients.

In one or more embodiments, the molar ratio of the alkylating agent to the nickel-containing compound (alkylating agent/Ni) can be varied from about 1:1 to about 1:200, in other embodiments from about 2:1 to about 100:1, and in other embodiments from about 5:1 to about 50:1. In one or more embodiments, the molar ratio of the fluorine-containing compound to the nickel-containing compound (F/Ni) can be varied from about 2:1 to about 500:1, in other embodiments from about 5:1 to about 300:1, and in other embodiments from about 10:1 to about 200:1. In one or more embodiments, the molar ratio of the chlorine-containing compound to the nickel-containing compound (Cl/Ni) can be varied from about 0.01:1 to about 0.5:1, in other embodiments from about 0.02:1 to about 0.3:1, and in other embodiments from about 0.05:1 to about 0.2:1. The term molar ratio, as used herein, refers to the equivalent ratio of relevant components of the ingredients, e.g., the ratio of equivalents of chlorine atoms on the chlorine-containing compound to equivalents of nickel atoms on the nickel-containing compound.

The catalyst composition may be formed by combining or mixing the catalyst ingredients. Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition of this invention can be formed by using one of the following methods.

In one or more embodiments, the catalyst composition may be formed in situ by adding the catalyst ingredients to a solution containing monomer and solvent, or simply bulk monomer, in either a stepwise or simultaneous manner. In one embodiment, the alkylating agent can be added first, followed by the nickel-containing compound, and then followed by the chlorine-containing compound and fluorine-containing compound.

In one or more embodiments, the catalyst ingredients may be pre-mixed outside the polymerization system at an appropriate temperature, which may be from about −20° C. to about 80° C., and the resulting catalyst composition may be aged for a period of time ranging from a few minutes to a few days and then added to the monomer.

In one or more embodiments, the catalyst composition may be pre-formed in the presence of at least one conjugated diene monomer. That is, the catalyst ingredients may be pre-mixed in the presence of a small amount of conjugated diene monomer at an appropriate temperature, which may be from about −20° C. to about 80° C. The amount of conjugated diene monomer that may be used for pre-forming the catalyst can range from about 1 to about 500 moles per mole, in other embodiments from about 5 to about 250 moles per mole, and in other embodiments from about 10 to about 100 moles per mole of the nickel-containing compound. The resulting catalyst composition may be aged for a period of time ranging from a few minutes to a few days and then added to the remainder of the conjugated diene monomer that is to be polymerized.

In one or more embodiments, the catalyst composition may be formed by using a two-stage procedure. The first stage involves combining the nickel-containing compound with the alkylating agent in the absence of conjugated diene monomer or in the presence of a small amount of conjugated diene monomer at an appropriate temperature, which may be from about −20° C. to about 80° C. In the second stage, the foregoing reaction mixture and the remaining catalyst components (i.e., the fluorine-containing compound and the chlorine-containing compound) can be charged in either a stepwise or simultaneous manner to the remainder of the conjugated diene monomer that is to be polymerized. In one or more embodiments, the chlorine-containing compound is added prior to the fluorine-containing compound.

In one or more embodiments, the catalyst composition may be formed by using another two-stage procedure. The first stage may involve combining the alkylating agent with the chlorine-containing compound at an appropriate temperature, which may be from about −20° C. to about 80° C. In the second stage, the foregoing reaction mixture, the nickel-containing compound, and the fluorine-containing compound can be charged in either a stepwise or simultaneous manner to the monomer.

When a solution of the catalyst composition or one or more of the catalyst ingredients is prepared outside the polymerization system as set forth in the foregoing methods, an organic solvent or carrier may be employed. The organic solvent may serve to dissolve the catalyst composition or ingredients, or the solvent may simply serve as a carrier in which the catalyst composition or ingredients may be suspended. The organic solvent may be inert to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used.

The catalyst composition of this invention exhibits very high catalytic activity for polymerizing conjugated dienes into cis-1,4-polydienes. Although specific embodiments may be directed toward the polymerization of 1,3-butadiene into cis-1,4-polybutadiene, other conjugated dienes can also be polymerized. Examples of other conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization.

The production of polymer can be accomplished by polymerizing conjugated diene monomer in the presence of a catalytically effective amount of the foregoing catalyst composition. The total catalyst concentration to be employed in the polymerization mass may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the nickel-containing compound used can be varied from about 0.01 to about 2 mmol, in other embodiments from about 0.02 to about 1 mmol, and in other embodiments from about 0.05 to about 0.5 mmol per 100 g of conjugated diene monomer.

The polymerization can be carried out in an organic solvent as the diluent. In one embodiment, a solution polymerization system can be employed, which is a system where the monomer to be polymerized and the polymer formed are soluble in the polymerization medium. Alternatively, a precipitation polymerization system may be employed by choosing a solvent in which the polymer formed is insoluble. In both cases, the monomer to be polymerized may be in a condensed phase. Also, the catalyst ingredients may be solubilized or suspended within the organic solvent. In these or other embodiments, the catalyst ingredients or components are unsupported or not impregnated onto a catalyst support. In other embodiments, the catalyst ingredients or components may be supported.

In performing these polymerizations, an amount of organic solvent in addition to the amount of organic solvent that may be used in preparing the catalyst composition may be added to the polymerization system. The additional organic solvent may be the same as or different from the organic solvent used in preparing the catalyst composition. An organic solvent that is inert with respect to the catalyst composition employed to catalyze the polymerization may be selected. Exemplary hydrocarbon solvents have been set forth above. When a solvent is employed, the concentration of the monomer to be polymerized may not be limited to a special range. In one or more embodiments, however, the concentration of the monomer present in the polymerization medium at the beginning of the polymerization can be in a range of from about 3% to about 80% by weight, in other embodiments from about 5% to about 50% by weight, and in other embodiments from about 10% to about 30% by weight.

The polymerization of conjugated dienes may also be carried out by means of bulk polymerization, which refers to a polymerization environment where substantially no solvents are employed. The bulk polymerization can be conducted either in a condensed liquid phase or in a gas phase.

The polymerization of conjugated dienes may be carried out as a batch process, a continuous process, or a semi-continuous process. In the semi-continuous process, monomer may be intermittently charged as needed to replace that monomer already polymerized. In any case, the polymerization may be conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, and in one embodiment in a temperature range being from about 20° C. to about 90° C. The heat of polymerization may be removed by external cooling (e.g., with a thermally controlled reactor jacket), internal cooling (e.g., by evaporation and condensation of the monomer or the solvent through the use of a reflux condenser connected to the reactor), or a combination of the methods. Although the polymerization pressure employed may vary widely, a pressure range of from about 1 atmosphere to about 10 atmospheres may be maintained.

Once a desired conversion is achieved, the polymerization can be stopped by adding a polymerization terminator that inactivates the catalyst. The terminator may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the terminator. The amount of the antioxidant employed may be in the range of 0.2% to 1% by weight of the polymer product.

When the polymerization mixture has been quenched, the polymer product can be recovered from the polymerization mixture by using any conventional procedures of desolventization and drying that are known in the art. For instance, the polymer can be recovered by subjecting the polymer cement to steam desolventization, followed by drying the resulting polymer crumbs in a hot air tunnel. Alternatively, the polymer may be recovered by directly drum-drying the polymer cement. The content of the volatile substances in the dried polymer can be below 1%, and in other embodiments below 0.5% by weight of the polymer.

Where 1,3-butadiene is polymerized, the number average molecular weight ($M_n$) of the cis-1,4-polybutadiene may be from about 5,000 to about 200,000, in other embodiments from about 25,000 to about 150,000, and in other embodiments from about 50,000 to about 120,000, as determined by using gel permeation chromatography (GPC) with polystyrene standards. In one or more embodiments of the present invention, the presence of the chlorine-containing compound (or the presence of chlorine atoms where the chlorine-containing compound is optional) may advantageously provide polymer product characterized by a relatively low molecular weight distribution. In one or more embodiments, the molecular weight distribution ($M_w/M_n$) of these polymers may be less than 4, in other embodiments less than 3.5, in other embodiments less than 3.0, and in other embodiments less than 2.7.

Where cis-1,4-polydienes are prepared, they can have a cis-1,4-linkage content that is greater than about 60%, in other embodiments greater than about 75%, in other embodiments greater than about 90%, and in other embodiments greater than about 95%. Also, these polymers may have a 1,2-linkage content that is less than about 10%, in other embodiments less than 5%, in other embodiments less than 2%, and in other embodiments less than 1%. The cis-1,4- and 1,2-linkage content can be determined by infrared spectroscopy.

The polydiene polymers of this invention are particularly useful in preparing tire components. These tire components can be prepared by using the polymers of this invention alone or together with other rubbery polymers. Other rubbery polymers that may be used include natural and synthetic elastomers. The synthetic elastomers typically derive from the polymerization of conjugated diene monomers. These conjugated diene monomers may be copolymerized with other monomers such as vinyl aromatic monomers. Other rubbery polymers may derive from the polymerization of ethylene together with one or more α-olefins and optionally one or more diene monomers.

Useful rubbery polymers include natural rubber, synthetic polyisoprene, polybutadiene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched and star shaped. Other ingredients that are typically employed in rubber compounding may also be added.

The rubber compositions may include fillers such as inorganic and organic fillers. The organic fillers include carbon black and starch. The inorganic fillers may include silica, aluminum hydroxide, magnesium hydroxide, clays (hydrated aluminum silicates), and mixtures thereof.

A multitude of rubber curing agents may be employed, including sulfur or peroxide-based curing systems. Curing agents are described in Kirk-Othmer, ENCYCLOPEDIA OF CHEMICAL TECHNOLOGY, Vol. 30, pgs. 365-468, (3$^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2$^{nd}$ Ed. 1989), which are incorporated herein by reference. Vulcanizing agents may be used alone or in combination. In one or more embodiments, the preparation of vulcanizable compositions and the construction and curing of the tire is not affected by the practice of this invention.

Other ingredients that may be employed include accelerators, oils, waxes, scorch inhibiting agents, processing aids, zinc oxide, tackifying resins, reinforcing resins, fatty acids such as stearic acid, peptizers, and one or more additional rubbers.

These rubber compositions are useful for forming tire components such as treads, subtreads, black sidewalls, body ply skins, bead filler, and the like. Preferably, the polydiene polymers are employed in tread formulations. In one or more embodiments, these tread formulations may include from about 10 to about 100% by weight, in other embodiments from about 35 to about 90% by weight, and in other embodiments from about 50 to 80% by weight of the polydiene polymer based on the total weight of the rubber within the formulation.

In one or more embodiments, the vulcanizable rubber composition may be prepared by forming an initial masterbatch that includes the rubber component and filler (the rubber component optionally including the polydiene polymer of this invention). This initial masterbatch may be mixed at a starting temperature of from about 25° C. to about 125° C. with a discharge temperature of about 135° C. to about 180° C. To prevent premature vulcanization (also known as scorch), this initial masterbatch may exclude vulcanizing agents. Once the initial masterbatch is processed, the vulcanizing agents may be introduced and blended into the initial masterbatch at low temperatures in a final mix stage, which preferably does not initiate the vulcanization process. Optionally, additional mixing stages, sometimes called remills, can be employed between the masterbatch mix stage and the final mix stage. Various ingredients including the functionalized polymer of this invention can be added during these remills. Rubber compounding techniques and the additives employed therein are generally known as disclosed in *The Compounding and Vulcanization of Rubber*, in *Rubber Technology* (2$^{nd}$ Ed. 1973).

The mixing conditions and procedures applicable to silica-filled tire formulations are also well known as described in U.S. Pat. Nos. 5,227,425, 5,719,207, 5,717,022, and European Patent No. 890,606, all of which are incorporated herein by reference. In one or more embodiments, where silica is employed as a filler (alone or in combination with other fillers), a coupling and/or shielding agent may be added to the rubber formulation during mixing. Useful coupling and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference. In one embodiment, the initial masterbatch is prepared by including the functionalized polymer of this invention and silica in the substantial absence of coupling and shielding agents.

Where the vulcanizable rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140 to about 180° C. Cured or crosslinked rubber compositions may be referred to as vulcanizates, which generally contain three-dimensional polymeric networks that are thermoset. The other ingredients, such as processing aides and fillers, may be evenly dispersed throughout the vulcanized network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1

Control

In Example 1, which is a control experiment, the polymerization of 1,3-butadiene to form cis-1,4-polybutadiene was catalyzed by a nickel-based catalyst system that was devoid of a chlorine-containing compound. An oven-dried 800-mL glass bottle was capped with a self-sealing rubber liner and a perforated metal cap. After the bottle was thoroughly purged with a stream of dry nitrogen, the bottle was charged with 106 g of hexanes and 227 g of a 1,3-butadiene/hexanes blend containing 22.0% by weight of 1,3-butadiene. The following catalyst ingredients were then charged into the bottle in the following order: (1) 0.69 mmol of triisobutylaluminum (TIBA), (2) 0.030 mmol of Ni(II) neodecanoate borate, which has a formula of $(C_9H_{19}COONiO)_3B$ and is hereinafter referred to by the abbreviation NiOB (Note: the millimolar quantity refers to the amount of Ni contained in NiOB), and (3) 8.40 mmol of boron trifluoride/n-hexanol complex $(BF_3 \cdot 2C_6H_{13}OH)$. The bottle was tumbled for 70 minutes in a water bath maintained at 64° C. The polymerization was terminated by addition of 3 mL of isopropanol containing 0.30 g of 2,6-di-tert-butyl-4-methylphenol. The resulting polymer cement was coagulated with 3 liters of isopropanol containing 0.5 g of 2,6-di-tert-butyl-4-methylphenol, and then drum-dried. The yield of the polymer was 43.9 g (87.8%). The Mooney viscosity ($ML_{1+4}$) of the polymer was determined at 100° C. with a Monsanto Mooney viscometer using a large rotor, a one-minute warm-up time, and a four-minute running time. The polymer had a Mooney viscosity of 43.3. As determined by gel permeation chromatography (GPC) that was calibrated by using polystyrene standards and Mark-Houwink constants for cis-1,4-polybutadiene, the polymer had a number average molecular weight ($M_n$) of 84,900, a weight average molecular weight ($M_w$) of 285,700, and a molecular weight distribution ($M_w/M_n$) of 3.37. The infrared spectroscopic analysis of the polymer indicated a cis-1,4-linkage content of 96.2%, a trans-1,4-linkage content of 1.4%, and a 1,2-linkage content of 2.4%. The monomer charge, the amounts of the catalyst ingredients, and the properties of the resulting cis-1,4-polybutadiene are summarized in Table I.

TABLE I

| | Example No. | | | | |
|---|---|---|---|---|---|
| | 1 (control) | 2 | 3 | 4 | 5 |
| Hexanes (g) | 106 | 106 | 106 | 106 | 106 |
| 22.4% 1,3-Bd/hexanes (g) | 227 | 227 | 227 | 227 | 227 |
| TIBA (mmol) | 0.69 | 0.69 | 0.69 | 0.69 | 0.69 |
| $SnCl_4$ (mmol) | 0 | 0.00065 | 0.00097 | 0.0013 | 0.0016 |
| NiOB (mmol) | 0.030 | 0.030 | 0.030 | 0.030 | 0.030 |
| $BF_3 \cdot 2C_6H_{13}OH$ (mmol) | 0.84 | 0.84 | 0.84 | 0.84 | 0.84 |
| Ni/Al/F molar ratio | 1:23:84 | 1:23:84 | 1:23:84 | 1:23:84 | 1:23:84 |
| Cl/Ni molar ratio | 0:1 | 0.087:1 | 0.13:1 | 0.17:1 | 0.22:1 |
| Polymer yield (%) after 70 min. at 64° C. | 87.8 | 91.0 | 90.6 | 89.8 | 88.2 |
| Mooney viscosity ($ML_{1+4}$) | 43.3 | 38.0 | 37.4 | 34.8 | 34.2 |
| $M_n$ | 84,900 | 87,500 | 87,900 | 84,800 | 87,000 |
| $M_w$ | 285,700 | 259,100 | 259,100 | 249,000 | 247,800 |
| $M_w/M_n$ | 3.37 | 2.96 | 2.95 | 2.93 | 2.85 |
| cis-1,4-linkage (%) | 96.2 | 96.2 | 96.2 | 96.3 | 96.2 |
| trans-1,4-linkage (%) | 1.4 | 1.4 | 1.4 | 1.3 | 1.3 |
| 1,2-linkage (%) | 2.4 | 2.4 | 2.4 | 2.4 | 2.5 |

| | Example No. | | | |
|---|---|---|---|---|
| | 6 | 7 | 8 | 9 |
| Hexanes (g) | 106 | 106 | 106 | 106 |
| 22.4% 1,3-Bd/hexanes (g) | 227 | 227 | 227 | 227 |
| TIBA (mmol) | 0.69 | 0.69 | 0.69 | 0.69 |
| $SnCl_4$ (mmol) | 0.0019 | 0.0023 | 0.0026 | 0.0032 |
| NiOB (mmol) | 0.030 | 0.030 | 0.030 | 0.030 |
| $BF_3 \cdot 2C_6H_{13}OH$ (mmol) | 0.84 | 0.84 | 0.84 | 0.84 |
| Ni/Al/F molar ratio | 1:23:84 | 1:23:84 | 1:23:84 | 1:23:84 |
| Cl/Ni molar ratio | 0.26:1 | 0.30:1 | 0.34:1 | 0.43:1 |
| Polymer yield (%) after 70 min. at 64° C. | 89.2 | 87.4 | 86.8 | 85.6 |
| Mooney viscosity ($ML_{1+4}$) | 33.1 | 34.5 | 33.7 | 34.4 |
| $M_n$ | 88,900 | 90,100 | 89,000 | 91,100 |
| $M_w$ | 250,900 | 251,500 | 249,200 | 255,400 |
| $M_w/M_n$ | 2.82 | 2.79 | 2.80 | 2.80 |
| cis-1,4-linkage (%) | 96.4 | 96.3 | 96.4 | 96.4 |
| trans-1,4-linkage (%) | 1.3 | 1.4 | 1.2 | 1.4 |
| 1,2-linkage (%) | 2.3 | 2.3 | 2.4 | 2.2 |

Examples 2-9

In Examples 2-9, which were conducted in parallel to Example 1 (control), the polymerization of 1,3-butadiene to form cis-1,4-polybutadiene was catalyzed by a nickel-based catalyst system that includes tin tetrachloride ($SnCl_4$) as a chlorine-containing compound. The same procedure as used in Example 1 was repeated except that $SnCl_4$ was employed as an additional catalyst ingredient. The amount of $SnCl_4$ used was varied in Examples 2-9 in order to vary the molar ratio of Cl/Ni. The catalyst ingredients were added to the 1,3-butadiene monomer solution in bottles in the following order: (1) TIBA, (2) $SnCl_4$, (3) NiOB, and (4) $BF_3 \cdot 2C_6H_{13}OH$. The monomer charge, the amounts of the catalyst ingredients, and the properties of the resulting cis-1,4-polybutadiene are summarized in Table I.

Examples 10-15

In Example 10 (control), which is similar to Example 1, the polymerization of 1,3-butadiene to form cis-1,4-polybutadiene was catalyzed by a nickel-based catalyst system that is devoid of a chlorine-containing compound. The procedure as described in Example 1 was followed except that the bottle was tumbled for 70 minutes in a water bath maintained at 67° C.

In Examples 11-15, which were conducted in parallel to Example 10 (control), the polymerization of 1,3-butadiene to form cis-1,4-polybutadiene was catalyzed by a nickel-based catalyst system that includes diethylaluminum ($Et_2AlCl$) as a chlorine-containing compound. The same procedure as used in Example 10 was used except that $Et_2AlCl$ was employed as an additional catalyst ingredient. The amount of $Et_2AlCl$ used was varied in Examples 11-15 in order to vary the molar ratio of Cl/Ni. The catalyst ingredients were added to the 1,3-butadiene monomer solution in bottles in the following order: (1) TIBA, (2) $Et_2AlCl$, (3) NiOB, and (4) $BF_3 \cdot 2C_6H_{13}OH$.

The monomer charge, the amounts of the catalyst ingredients, and the properties of the resulting cis-1,4-polybutadiene in Examples 10-15 are summarized in Table II.

TABLE II

| | Example No. | | | | | |
|---|---|---|---|---|---|---|
| | 10 (control) | 11 | 12 | 13 | 14 | 15 |
| Hexanes (g) | 99 | 99 | 99 | 99 | 99 | 99 |
| 21.4% 1,3-Bd/hexanes (g) | 234 | 234 | 234 | 234 | 234 | 234 |
| TIBA (mmol) | 0.69 | 0.69 | 0.69 | 0.69 | 0.69 | 0.69 |
| $Et_2AlCl$ (mmol) | 0 | 0.0026 | 0.0039 | 0.0065 | 0.0097 | 0.014 |
| NiOB (mmol) | 0.030 | 0.030 | 0.030 | 0.030 | 0.030 | 0.030 |
| $BF_3 \cdot 2C_6H_{13}OH$ (mmol) | 0.84 | 0.84 | 0.84 | 0.84 | 0.84 | 0.84 |
| Ni/Al/F molar ratio | 1:23:84 | 1:23:84 | 1:23:84 | 1:23:84 | 1:23:84 | 1:23:84 |
| Cl/Ni molar ratio | 0:1 | 0.087:1 | 0.13:1 | 0.22:1 | 0.32:1 | 0.47:1 |
| Polymer yield (%) after 70 min. at 67° C. | 93.5 | 92.6 | 91.6 | 90.2 | 86.4 | 77.0 |
| Mooney viscosity ($ML_{1+4}$) | 39.0 | 34.0 | 33.8 | 32.7 | 32.8 | 35.5 |
| $M_n$ | 82,600 | 82,600 | 82,300 | 83,400 | 84,800 | 89,700 |
| $M_w$ | 287,600 | 254,200 | 255,400 | 248,800 | 253,700 | 271,000 |
| $M_w/M_n$ | 3.48 | 3.08 | 3.10 | 2.98 | 2.99 | 3.02 |
| cis-1,4-linkage (%) | 96.0 | 96.3 | 96.3 | 96.4 | 96.6 | 96.7 |
| trans-1,4-linkage (%) | 1.5 | 1.3 | 1.3 | 1.3 | 1.2 | 1.1 |
| 1,2-linkage (%) | 2.5 | 2.4 | 2.4 | 2.3 | 2.2 | 2.2 |

A comparison of the results obtained in Examples 2-7 versus Example 1 (control) and Examples 11-13 versus 10 (control) indicates that the inclusion of a small amount of a chlorine-containing compound ($SnCl_4$ or $Et_2AlCl$) in the nickel-based catalyst system can effectively reduce the molecular weight distribution of cis-1,4-polybutadiene without adversely affecting catalyst activity and polymer microstructure such as cis-1,4-linkage content. The data in Tables I and II also shows that at higher chlorine concentrations the benefit of molecular weight reduction can be achieved in the face of reduced polymer conversion.

Various modifications and alterations that do not depart from the scope and spirit of this invention will become apparent to those skilled in the art. This invention is not to be duly limited to the illustrative embodiments set forth herein.

The invention claimed is:

1. A catalyst composition that is the combination of or the reaction product of ingredients comprising:
   (a) a nickel-containing compound;
   (b) an alkylating agent;
   (c) a fluorine-containing compound; and
   (d) a chlorine-containing compound,
   where the molar ratio of said alkylating agent to said nickel-containing compound (alkylating agent/Ni) is from about 2:1 to about 100:1, where the molar ratio of said fluorine-containing compound to said nickel-containing compound (F/Ni) is from about 5:1 to about 200:1, and where the molar ratio of said chlorine-containing compound to said nickel-containing compound (Cl/Ni) is from about 0.02:1 to about 0.3:1.

2. The composition of claim 1, where said nickel-containing compound is selected form the group consisting of nickel carboxylates, nickel carboxylate borates, nickel organophosphates, nickel organophosphonates, nickel organophosphinates, nickel carbamates, nickel dithiocarbamates, nickel xanthates, nickel β-diketonates, nickel alkoxides or aryloxides, nickel halides, nickel pseudo-halides, nickel oxyhalides, and organonickel compounds.

3. The composition of claim 1, where the alkylating agent is an organoaluminum compound.

4. The composition of claim 3, where said organoaluminum compound includes those represented by the formula $AlR_nX_{3-n}$, where each R, which may be the same or different, is a mono-valent organic group that is attached to the aluminum atom via a carbon atom, where each X, which may be the same or different, is a hydrogen atom, a carboxylate group, an alkoxide group, or an aryloxide group, and where n is an integer of 1 to 3.

5. The composition of claim 1, where said fluorine-containing compound is selected from the group consisting of elemental fluorine, halogen fluorides, hydrogen fluoride, organic fluorides, inorganic fluorides, metallic fluorides, organometallic fluorides, and mixtures thereof.

6. The composition of claim 1, where said chlorine-containing compound is selected from the group consisting of elemental chlorine, halogen chlorides, hydrogen chloride, organic chlorides, inorganic chlorides, metallic chlorides, organometallic chlorides, and mixtures thereof.

7. The composition of claim 5, where said fluorine-containing compound includes a complex with an ether, alcohol, water, aldehyde, ketone, ester, nitrile, or combinations thereof.

8. The composition of claim 1, further comprising conjugated diene monomer.

9. The composition of claim 1, where the ingredients comprise Ni(II) neodecanoate borate, triisobutylaluminum, boron trifluoride/n-hexanol complex, and tin tetrachloride.

10. A catalyst composition that is the combination of or the reaction product of ingredients comprising:
   (a) a nickel-containing compound;
   (b) an alkylating agent;
   (c) a fluorine-containing compound; and
   (d) optionally a chlorine-containing compound,
   with the proviso that at least one of the ingredients include a chlorine atom,
   where the molar ratio of said alkylating agent to said nickel-containing compound (alkylating agent/Ni) is from about 2:1 to about 100:1, where the molar ratio of said fluorine-containing compound to said nickel-containing compound (F/Ni) is from about 5:1 to about 200:1, and where the molar ratio of said chlorine-containing compound to said nickel-containing compound (Cl/Ni) is from about 0.02:1 to about 0.3:1.

11. The catalyst composition of claim 10, where the alkylating agent is an organoaluminum compound.

12. The catalyst composition of claim 10, where said fluorine-containing compound is selected from the group consisting of elemental fluorine, halogen fluorides, hydrogen fluoride, organic fluorides, inorganic fluorides, metallic fluorides, organometallic fluorides, and mixtures thereof.

13. The catalyst composition of claim 10, where said chlorine-containing compound is selected from the group consisting of elemental chlorine, halogen chlorides, hydrogen chloride, organic chlorides, inorganic chlorides, metallic chlorides, organometallic chlorides, and mixtures thereof.

14. The catalyst composition of claim 10, where said fluorine-containing compound includes a complex with an ether, alcohol, water aldehyde, ketone, ester, nitrile, or combinations thereof.

15. A catalyst composition that is the combination of or the reaction product of ingredients comprising:
   (a) a nickel-containing compound;
   (b) an alkylating agent;
   (c) a fluorine-containing compound; and
   (d) a chlorine-containing compound,
where said chlorine-containing compound is selected from the group consisting of elemental chlorine, halogen chlorides, hydrogen chloride, organic chlorides, inorganic chlorides, metallic chlorides, organometallic chlorides, and mixtures thereof, wherein said organic chlorides are selected from the group consisting of t-butyl chloride, allyl chloride, benzyl chloride, chloro-di-phenylmethane, triphenylmethyl chloride, benzylidene chloride, methyltrichlorosilane, phenyltrichlorosilane, dimethyldichlorosilane, diphenyldichlorosilane, trimethylechlorosilane, benzoyl chloride, propionyl chloride, and methyl chloroformate.

16. The composition of claim 15, where the molar ratio of said alkylating agent to said nickel-containing compound (alkylating agent/Ni) is from about 1:1 to about 200:1, where the molar ratio of said fluorine-containing compound to said nickel-containing compound (F/Ni) is from about 2:1 to about 500:1, and where the molar ratio of said chlorine-containing compound to said nickel-containing compound (Cl/Ni) is from about 0.01:1 to about 0.5:1.

* * * * *

UNITED STATES PATENT AND TRADEMARK OFFICE
CERTIFICATE OF CORRECTION

PATENT NO. : 7,585,805 B2  Page 1 of 1
APPLICATION NO. : 11/285434
DATED : September 8, 2009
INVENTOR(S) : Steven Luo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 867 days.

Signed and Sealed this

Fourteenth Day of September, 2010

David J. Kappos
*Director of the United States Patent and Trademark Office*